3,352,880
UNSATURATED METHYLENE-CARBONAMIDE-SULPHONAMIDES AND PROCESS OF PRODUCING THEM
Erwin Müller, Leverkusen, Germany, assignor to Farbenfabriken Bayer Aktiengesellschaft, Leverkusen, Germany, a corporation of Germany
No Drawing. Filed Dec. 23, 1964, Ser. No. 420,766
Claims priority, application Germany, Jan. 10, 1964, F 41,710/64
13 Claims. (Cl. 260—301)

This invention relates to olefinically unsaturated methylene-carbonamide-sulphonamides, i.e. olefinically unsaturated compounds which contain the group

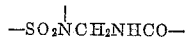

at least once in the molecule, and more especially to such methylene-carbonamide-sulphonamides in which the carbon atom of the methylene group is bonded to the nitrogen atom of the amide group of an $\alpha,\beta$-olefinically unsaturated carboxylic acid amide and to the nitrogen atom of an organic sulphonic acid amide, as well as to a process of producing said compounds.

It should be possible to obtain compounds of this kind by linking organic sulphonamides and olefinically unsaturated carbonamides with formaldehyde but such condensation reactions, which are already known insofar as they concern the linking of similar and different carbonamides, usually proceed with poor yields. In particular, the linking of different kinds of carbonamides, which leads to the formation of methylene-bis-carbonamides, involves difficulties since the linking of carbonamides of the same kind via formaldehyde to form symmetrical methylene-bis-carbonamide takes place preferentially.

These difficulties are still more marked when attempts are made to link sulphonamides with unsaturated carbonamides by way of formaldehyde to form hitherto unknown compounds having the grouping

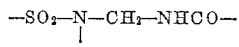

On condensation of the components in acid solution with formaldehyde, the desired compounds in question can either not be obtained at all or are obtained only in very low yields, which are practically of no interest, in addition to large quantities of resinuous products.

It has now been found, that such asymmetrical methylene-bis-amides, i.e. olefinically unsaturated methylene-carbonamide-sulphonamides, can be obtained easily and in good yields by reacting N-methylol-alkylethers of $\alpha,\beta$-unsaturated carboxylic acid amides with compounds which contain an —SO$_2$NH— group at elevated temperatures, preferably 100 to 170° C. in the presence of acid catalysts which do not have a polymerising effect and in the presence of polymerisation inhibitors. In this process, the said components undergo condensation with splitting off of the alcohol component of the methylol-alkyl ether group, according to the equation:

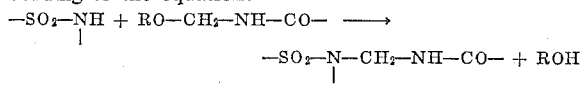

The reaction is preferably carried out in the presence of an inert organic solvent which boils between 100 and 170° C.

The course of the reaction indicated above is surprising in that methylol-alkyl ethers of carboxylic acid amides are normally converted into symmetrical methylene-bis-carbonamides in the presence of acid catalysts at elevated temperatures:

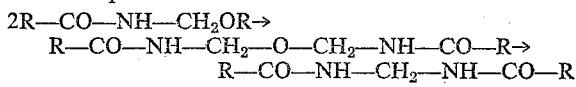

The most important compounds of the invention correspond to the formula (I) 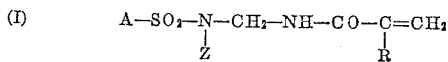

wherein A denotes a radical selected from the group consisting of aryl, alkyl and halogenated alkyl-radicals Z denotes a member of the group consisting of a hydrogen atom, an alkyl, cycloalkyl, aryl, aralykyl, acyl, an esterified carboxyl and a carbonyl group, the carbon atoms of the latter being bonded to the aryl radical A in ortho position to the SO$_2$-group, and R stands for a member of the group consisting of a hydrogen atom and a methyl group. The preferred radicals A are lower alkyl groups having 1 to 6 carbon atoms, such as methyl, ethyl, propyl, butyl, and mononuclear radicals of the benzene series, such as phenyl and phenyl substituted by halogen atoms, as for instance chlorine, bromine, alkyl radicals, as for instance methyl, ethyl, propyl, butyl, or other substituents, such as nitro. Especially suitable substituents are: a hydrogen atom, a methyl group, CH$_3$SO$_2$-group, a carboxyalkyl group having 1 to 6 carbon atoms in the alkyl radical, and a carbonyl group as defined above.

Compounds of the above general Formula I in which Z stands for a carbonyl group may be illustrated by the following Formula II in which R has the same meaning as above:

(II) 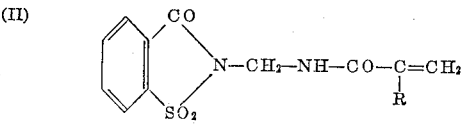

Suitable methylol-alkyl ethers of $\alpha:\beta$-unsaturated carboxylic acid amides for the present process are especially N-methylol-alkyl ethers of amides of $\alpha:\beta$-unsaturated monocarboxylic acids, such as N-methylolalkylether of acrylic acid amide and methacrylic acid amide. The term "methylol-alkyl ether groups," in this context, means both methylol ethers which contain aliphatic alkyl groups and those which contain cycloalkyl groups. Of special interest for this purpose are N-methylol-methyl ether, -ethyl ether, -propyl ether, -butyl ether and -cyclohexyl ether of acrylamide and of methacrylamide.

As compounds containing SO$_2$NH-groups i.e. sulphonamides having at least one active hydrogen attached to the nitrogen atom, there may be mentioned, as the most important types, arylsulphonamides of the general formula (III) 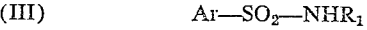

wherein R$_1$ denotes an alkyl-, cycloalkyl-, aryl- or acyl- (especially acyl derived from an organic sulphonic acid) radical and may also denote a carboxylalkyl- or carboxyaryl radical. The symbol Ar in this formula stands for an aryl radical which may be substituted, preferably a phenyl radical.

Examples are:
3:4 - dichlorobenzene-sulphonamide, 3:4-dichlorobenzene-N-methylsulphonamide, 4-toluenesulphonamide, 4-nitrobenzene sulphonamide as well as N-acylsulphonamides (for example N-sulphonyl-sulphonamide) or mixed sulphonyl-carbonyl amides of the types
C$_6$H$_5$—SO$_2$—NH—COR′
or C$_6$H$_5$—SO$_2$—NH—COOR′ wherein R′ denotes a lower alkyl radical or aryl radical.

Another type of sulphonamides which can be used is that of aliphatic sulphonamides according to the general formula (IV) 

wherein the radical Alk denotes a lower aliphatic alkyl radical such as a methyl-, ethyl-, propyl-, butyl-, or a halogen substituted alkyl radical and $R_1$ has the same meaning as given for Formula III above.

A third interesting group of compounds which contain sulphonamide groups are those in which the sulphonamide groups forms part of a cyclic ring system as, for example, in the sultams or in compounds of the benzoic acid sulphimide type.

The condensation of the reaction components by the present process is carried out in such a manner that preferably approximately molar quantities of sulphonamide and α,β-unsaturated carbonamide-N-methylol-alkylether (if desired in the presence of an inert solvent such as chlorobenzene, dichlorobenzene, trichlorobenzene, toluene, xylene, which boils between 100 and 170° C.), are heated with the addition of an acid catalyst which has no polymerising effect and in the presence of a polymerisation inhibitor. At temperatures of 100 to 170° C., alcohol is split off and may subsequently be distilled off azeotropically as a mixture with the above mentioned high boiling inert solvent. The condensation is terminated in this case when the distillation temperature corresponds to the boiling point of the inert solvent. On cooling the solution, the reaction products are in most cases precipitated in good yields. They may then be purified by crystallisation or distillation.

Substances preferably used as acid catalysts which have no polymerising effect are organic sulphonic acids such as p-toluene sulphonic acid, chlorobenzene sulphonic acid, strong mineral acids such as sulphuric acid, phosphoric acid, hydrochloric acid etc. strong carboxylic acids, for example halogenated aliphatic carboxylic acids such as chloroacetic acid and the like. The acid catalysts should be used in quantities of 0.1 to 3% by weight, preferably 0.1 to 0.5% by weight, calculated on the sum of the reaction components put into the process.

To prevent polymerisation reactions, the condensation reactions are carried out in the presence of polymerisation inhibitors such as phenothiazine, quinoidic or phenolic compounds such as hydroquinone, tertiary butylphenol, and further, copper oleate and others. These polymerisation retarders may be used in quantities of 0.01 to 1% by weight calculated on the quantity of polymerisable acid amide employed.

Example 1

After the addition of 500 cc. of chlorobenzene, 0.6 g. of p-toluenesulphonic acid and 0.1 g. of phenothiazine, 129 g. of methacrylamide-N-methylolmethyl ether (1 mol) and 240 g. of 3:4-dichlorobenzenesulphone-N-methylamide (1 mol) are gradually heated to 130 to 140° C. in a flask equipped with descending condenser while the mixture is stirred and carbon dioxide is passed over. The methanol that splits off distills over first at 100 to 110° C. A mixture of methanol and chlorobenzene then distills over and finally the boiling point of pure chlorobenzene is reached. Condensation is now terminated. The mixture is left to cool, filtered with suction and the reaction product is recrystallised from methanol. M.P. 128° C.; 270 g.

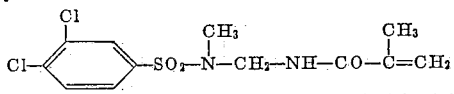

$C_{12}H_{14}O_3SN_2Cl_2$—Calculated: C, 42.75; H, 4.16; O, 14.25; N, 8.32; S, 9.5; Cl, 21.1. Found: C, 42.57; H, 4.35; O, 14.9; N, 8.6; S, 9.2; Cl, 21.05.

Example 2

226 g. of 3:4-dichlorobenzenesulphonamide (1 mol), 129 g. of methacrylamide-N-methylol-methyl ether (1 mol) and 0.6 g. of p-toluenesulphonic acid are reacted together in 500 cc. of xylene by the method described in Example 1.

M.P. from methanol=148–150° C.

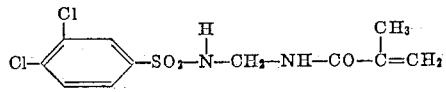

$C_{11}H_{12}O_3N_2Cl_2S$—Calculated: C, 40.8; H, 3.7; O, 14.8; N, 8.67; S, 9.9; Cl, 22.0. Found: C, 40.46; H, 3.68; O, 15.45; N, 8.39; S, 10.0; Cl, 22.15.

Example 3

240 g. of 3:4-dichlorobenzenesulphone-N-methylamide (1 mol) 115 g. of acrylamide-N-methylolmethyl ether, 0.6 g. of p-toluenesulphonic acid and 500 cc. of chlorobenzene are reacted together by the method described in Example 1. M.P. from butanol=155° C., yield 143 g.

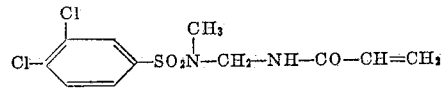

$C_{11}H_{12}O_3N_2Cl_2S$—Calculated: C, 40.8; H, 3.7; O, 14.8; N, 8.6; Cl, 21.9; S, 9.5. Found: C, 41.08; H, 3.85; O, 15.16; N, 8.5; Cl, 22.3; S, 9.75.

Example 4

160 g. of benzenesulphonamide (1 mol), 129 g. of methacrylamide-N-methylol-methyl ether (1 mol) and 1.2 g. of p-toluenesulphonic acid are reacted together in 500 cc. of chlorobenzene by the method described in Example 1. M.P. from methanol=145° C.

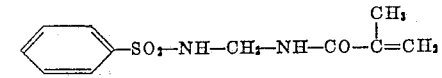

$C_{11}H_{14}O_3N_2S$—Calculated: C, 52.0; H, 5.5; O, 19.0; N, 11.0; S, 12.7. Found: C, 52.1; H, 5.51; O, 19.1; N, 10.8; S, 12.8.

Example 5

In the manner described in Example 1, 183 g. of benzoic acid sulphonimide (1 mol), 129 g. of methacrylamide-N-methylolmethyl ether (1 mol) and 0.6 g. p-toluenesulphonic acid are reacted together in 500 cc. of chlorobenzene. The phenothiazine was replaced by 0.2 g. of hydroquinone. M.P. from ethyl acetate=135° C., yield 250 g.

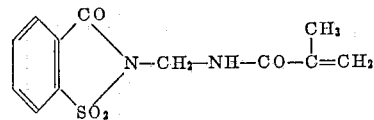

$C_{12}H_{12}O_4S_2$—Calculated: C, 51.2; H, 4.3; O, 22.9; S, 11.4; N, 10.0. Found: C, 51.4; H, 4.3; O, 22.9; S, 9.8; N, 11.2.

Example 6

235 g. of benzenesulphone-N-methylsulphonamide (1 mol) and 129 g. of methacrylamide-N-methylolmethyl ether (1 mol) are reacted together in 500 cc. of chlorobenzene by the method according to Example 1. M.P. from methanol=144° C.

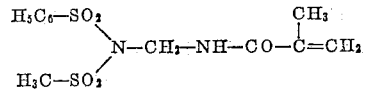

Example 7

After the addition of 0.5 g. of p-toluenesulphonic acid and 0.1 g. of 2:6-ditertiarybutylphenol-4-methylolmethyl ether, 143 g. of methacrylamide-N-methylolethyl ether (1 mol) and 109 g. of methyl-N-methylsulphonamide (1 mol) are heated to 130 to 140° C. in a flask equipped with descending condenser while carbon dioxide is passed over. Methyl alcohol distills over at about 110° C. When 42 g. of methyl alcohol had been split off, the distillation residue was redistilled from water after cooling. M.P. 150° C.

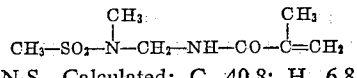

$C_7H_{14}O_3N_2S$—Calculated: C, 40.8; H, 6.8; O, 23.3; N, 13.6; S, 15.5. Found: C, 39.5; H, 6.6; O, 24.7; N, 12.6; S, 17.7.

Example 8

229 g. of benzenesulphonyl-ethyl urethane (1 mol) and 129 g. of methacrylamide-N-methylolmethyl ether (1 mol) are reacted together under the above mentioned conditions after the addition of 0.6 g. of toluenesulphonic acid and 500 cc. of chlorobenzene and of 0.1 g. of phenothiazine. The condensation product separates after cooling and is recrystallised from methanol. M.P. 144° C., yield 125 g.

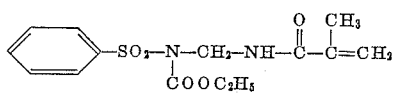

$C_{14}H_{18}O_5N_2S$—Calculated: C, 51.5; H, 5.5; O, 24.5; N, 8.6; S, 9.8. Found: C, 52.1; H, 5.4; O, 24.1; N, 8.9; S, 9.5.

The compounds obtainable by the present process represent valuable substances having a bacteriostatic action. In addition, they can be used as intermediate products for many different kinds of syntheses, especially for the production of polymers and copolymers.

The olefinically unsaturated methylene-carbonamide-sulphonamides of the present invention may be polymerised separately to form homopolymers, or may be polymerised in admixture with each other, according to known methods in the presence of radical forming catalysts, for instance in organic solvents or in an aqueous medium, for example as solids or in solution or in aqueous emulsions. It is preferable to use these monomers in admixture with other olefinically unsaturated monomers to prepare copolymers, in which case the first mentioned monomers are used in quantities of about 0.2 to 50, preferably 0.5 to 30% by weight.

Examples of suitable olefinically unsaturated monomers which may be used as components for the copolymerization are:

(a) $\alpha$:$\beta$-olefinically unsaturated monocarboxylic acids and their derivatives such as acrylic and methacrylic acid amides, acryl and methacryl nitrile, esters of acrylic and methacrylic acid, particularly those with saturated monohydric aliphatic or cycloaliphatic alcohols with 1 to 20 carbon atoms, such as esters of the abovementioned acid with methyl-, ethyl-, propyl-, isopropyl-, isobutyl, hexyl-, octyl-, stearyl alcohol, cyclohexanol, methylcyclohexanol, and with benzyl alcohol, phenol, cresol or furfuryl alcohol;

(b) Aromatic monovinyl compounds such as styrene, $\alpha$-methyl-styrene, vinyl toluene, p-chlorostyrene or other vinyl benzenes substituted in the nucleus;

(c) Esters of vinyl alcohol with carboxylic acid or with hydrohalic acids, vinyl ethers, vinyl ketones, such as vinyl chloride, vinylidene chloride, vinyl acetate, vinyl propionate, vinyl ethyl ether, vinylisobutyl ether;

(d) Conjugated diolefines with 4 to 6 carbon atoms, such as butadiene, isoprene, 2:3-dimethyl-butadiene, chloroprene;

(e) N-methylolethers of acrylic acid amide and methacrylic acid amide;

(f) Mannich bases of acrylic acid amide and methacrylic acid amide (compare British Patent 898,967).

In addition to the above, other monoolefinically unsaturated monomers may be used as copolymerisation components, for example esters of maleic acid, fumaric acid or crotonic acid styrene sulphonic acid or unsaturated aliphatic or cycloaliphatic hydrocarbons. In addition monomers which have a cross-linking action and which contain several non-conjugated olefinically unsaturated groups may be used in proportions of about 0.01 to 5, preferably 0.01 to 3% by weight calculated on the total weight of monomers; examples of these are glycol diacrylate, glycol dimethacrylate, acrylic acid and/or methacrylic acid allyl esters, divinylbenzene, triacrylolperhydro-s-triazine, triallyl cyanurate or substitution products of the above compounds.

The copolymers may be prepared from two or more monomers belonging to different classes of compounds. The monomers will be chosen according to the properties that are required of the copolymer.

Example 9

In a 2 litre glass flask equipped with stirrer, thermometer reflux condenser and gas inlet tube there are dissolved 12 g. of the reaction product of 1 mol of oleyl alcohol and 5 moles of ethylene oxide and 1 g. of the sodium salt of a naphthaline sulphonic acid-formaldehyde-condensation product in 300 g. of desalted water. Thereafter, the air in the glass flask is replaced by nitrogen, the solution is heated to 40° C. and 0.8 g. of potassium persulphate and 1.2 g. of sodium pyrosulphite are added to the solution. Within 3 hours there is slowly added a mixture of 192 g. of butyl acrylate and 8 g. of the compound of Example 1. Thereafter, the reaction mixture is kept while stirring for 3 hours at a temperature of 45° C. There is obtained a stable copolymer latex with 39% solids content.

Example 10

150 g. of ethyl acrylate, 30 g. of methyl methacrylate, 15 g. of styrene and 5 g. of the compound of Example 4 are copolymerised under the conditions disclosed in Example 9. There is obtained a stable copolymer emulsion with 38.5% solids content.

What I claim is:

1. A compound of the formula

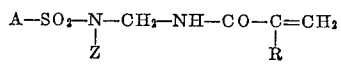

wherein

A is a member selected from the group consisting of chloro-phenyl, dichlorophenyl, lower alkyl phenyl, nitrophenyl and halogenated lower alkyl;

R is a member selected from the group consisting of hydrogen and methyl;

Z is a member selected from the group consisting of hydrogen, lower alkyl, cyclohexyl, lower alkyl sulfonyl, lower alkoxy carbonyl and carbonyl, A being defined as phenyl when Z is defined as lower alkyl sulfonyl and carbonyl radicals, the carbon atoms of the carbonyl radical being bonded to A in ortho position to the sulfo group.

2. A compound of the formula

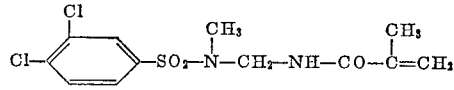

3. A compound of the formula

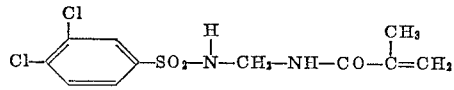

4. A compound of the formula

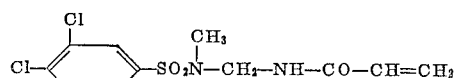

5. A compound of the formula

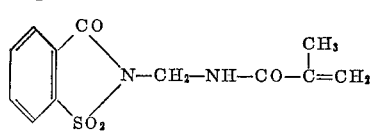

6. A compound of the formula

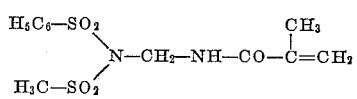

7. A compound of the formula

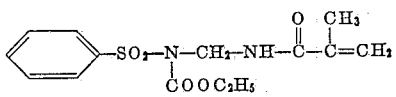

8. A process for the preparation of an olefinically unsaturated methylene-carbonamide-sulphonamide having at least one

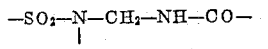

group, comprising condensing the N-methylolalkylether of an α,β-olefinically unsaturated carboxylic acid amide at about 100–170° C. with a member selected from the group consisting of an aryl, alkyl and halogenated alkyl sulfonic acid amide, effecting the reaction in the presence of active amounts of a non-polymerizing acid catalyst and a polymerisation inhibitor.

9. A process according to claim 8, wherein said N-methylolalkylether is a N-methylolalkylether of an acrylic acid.

10. A process according to claim 8, wherein said organic sulphonic acid amide is an aromatic sulphonic acid amide.

11. A process according to claim 8, wherein said organic sulphonic acid amide is an aliphatic sulphonic acid amide.

12. A process according to claim 8, wherein said organic sulphonic acid amide is a benzoic acid sulphoimide.

13. The process of claim 8 wherein the reaction is effected with about equimolar proportions.

References Cited

UNITED STATES PATENTS 2,478,378   8/1949   Dickey _____ 260—556 X

FOREIGN PATENTS 1,230,790   4/1960   France.
780,284   7/1957   Great Britain.
792,874   4/1958   Great Britain.

OTHER REFERENCES

Chemical Abstracts, vol. 52, col. 19602 (1958).
Houben-Weyl: 4th ed. Methoden der Organischen Chemie, Band 9, page 618, Georg Thiem Verlag, Stuttgart, Germany (1955).

JOHN D. RANDOLPH, *Primary Examiner.*